United States Patent [19]

Sasaki

[11] Patent Number: 4,974,088
[45] Date of Patent: Nov. 27, 1990

[54] REMOTE CONTROL APPARATUS FOR A ROTATING TELEVISION CAMERA BASE

[75] Inventor: Takeshi Sasaki, Toyota, Japan
[73] Assignee: Maruwa Electronic & Chemical Company, Toyota, Japan
[21] Appl. No.: 350,761
[22] Filed: May 12, 1989
[30] Foreign Application Priority Data May 13, 1988 [JP] Japan .................................. 63-117743
May 13, 1988 [JP] Japan .................................. 63-117744

[51] Int. Cl.⁵ .................................................. H04N 5/30
[52] U.S. Cl. ...................................... 358/210; 358/229
[58] Field of Search ......................... 358/210, 229, 108

[56] References Cited

U.S. PATENT DOCUMENTS

| | | | |
|---|---|---|---|
| 4,321,625 | 3/1982 | Smith | 358/210 |
| 4,326,221 | 4/1982 | Mallos et al. | 358/210 |
| 4,337,482 | 6/1982 | Coutta | 358/210 |
| 4,369,467 | 1/1983 | Smith | 358/210 |
| 4,543,609 | 9/1985 | Smith | 358/210 |

*Primary Examiner*—Stephen Brinich
*Attorney, Agent, or Firm*—Oblon, Spivak, McClelland, Maier & Neustadt

[57] ABSTRACT

A remote control apparatus for a rotating camera base that supports a television camera such that it is rotatable in the horizontal and vertical directions. The remote control apparatus comprises a first controlling circuit that outputs a digital signal for driving and controlling the rotating camera base; a control box including a modulating circuit that outputs a modulated version of the digital signal from the first controlling circuit with a prescribed carrier wave, said control box being electrically connected to the first controlling circuit; a demodulating circuit that recovers the digital signal from the modulated wave from the modulating circuit, said demodulating circuit being provided in the rotating camera base and electrically connected to the modulating circuit; and a second controlling circuit that drives and controls the rotating camera base based on the digital signal from the demodulating circuit, said second controlling circuit being electrically connected to the demodulating circuit.

7 Claims, 6 Drawing Sheets

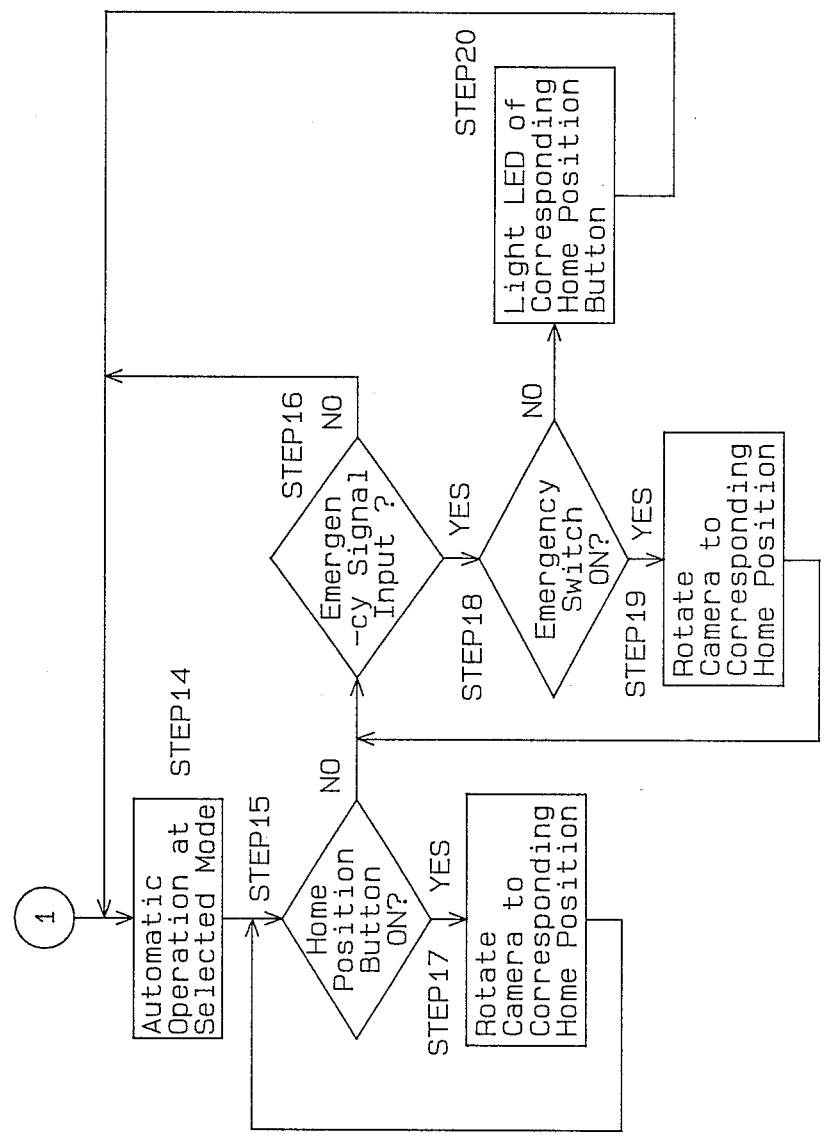

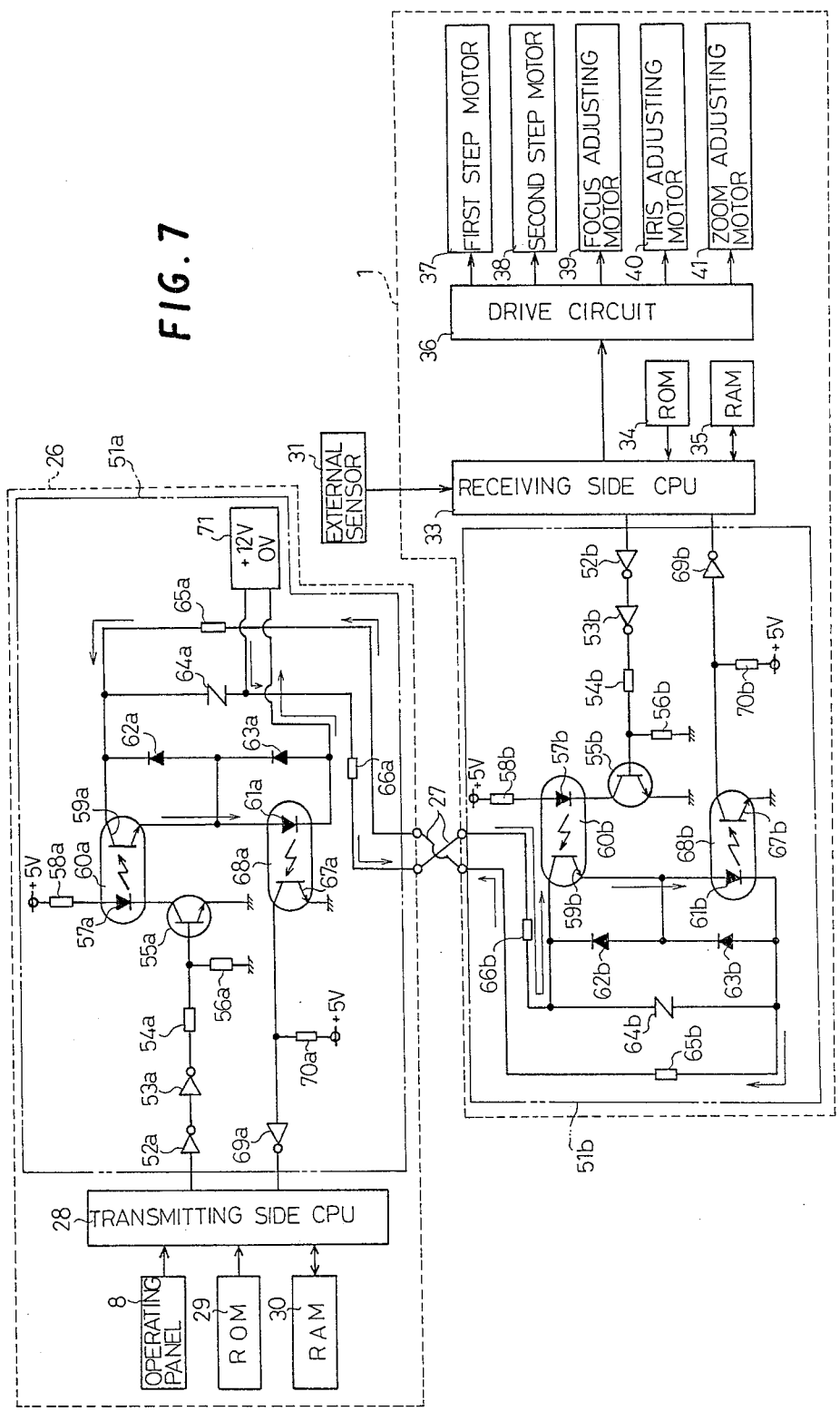

REMOTE CONTROL APPARATUS FOR A ROTATING TELEVISION CAMERA BASE

FIELD OF THE INVENTION

This invention relates to a remote control apparatus for regulating the rotation of a monitoring television camera in the horizontal and vertical directions.

DESCRIPTION OF THE RELATED ART

A monitoring television camera is commonly installed near the ceiling of, for example, shops, and others, and the rotation of such television camera is regulated by the remote control of a control apparatus provided inside another room or another building. The presence of an abnormal condition in an indicated location can be verified by visual inspection of the scene of said location as shown on a monitor.

In the remote control apparatus mentioned above, the rotation of the camera base is regulated by means of a device commonly called joy-stick. By moving the handle of the joy-stick upward, downward, to the left or to the right, the rotating camera base is enabled to be rotationally driven in the direction corresponding to the movement of the joy-stick handle. Consequently, when a plurality of locations needs to be monitored by means of a television camera, the monitoring person has to operate the joy-stick at each change of location and rotationally drive the rotating camera base. In such a case, the monitoring operation can become very complicated.

In a remote control apparatus such as the one mentioned above, the television camera and its rotating base is usually connected to the control apparatus by a plurality of signal lines. Each of the various operating signals for driving the television camera is sent through a different signal line and are transmitted by relay control method. However, in this kind of remote control apparatus, since a plurality of signal lines between the television camera and the remote control apparatus is needed, the process of installing the signal lines becomes complicated. Also, since the structure is such that the potential difference between each of the signal lines and the ground line is transmitted, the system is susceptible to noise, and, consequently to erratic performance, making the apparatus not very reliable. Further, since the apparatus is susceptible to the effects of noise, the length of the signal lines is limited to a length of no more than 2 kms.

SUMMARY OF THE INVENTION

An object of the present invention is to provide a remote control apparatus for a rotating camera base wherein erratic performance due to the effects of noise can be prevented, thus exhibiting high reliability; a minimum of signal lines is needed thus simplifying the wiring construction; and remote control even from a far distance can be made possible.

Another object of the present invention is to provide a remote control apparatus for a monitoring television camera that enables the easy monitoring of a plurality of locations by automatically driving and rotating the rotating camera base, without requiring the operation by a monitoring person; enables the speedy monitoring of a plurality of predetermined locations by a simple operation; when an abnormal condition occurs in any one of the predetermined locations, enables the automatic drive and rotation of the rotating camera base such that the scene at that location is shown on the monitor, or, when not needed, disables this operation.

In order to realize the objects mentioned above, the remote control apparatus for a rotating television camera base of the present invention comprises a first controlling means that outputs a digital signal for driving and controlling the rotating camera base; a control box including a modulating circuit that outputs a modulated version of the digital signal from the first controlling means with prescribed carrier wave, said control box being electrically connected to the first controlling means; a demodulating circuit that recovers the digital signal from the modulated version from the modulating circuit, said demodulating circuit being provided in the rotating television camera base and electrically connected to the modulating circuit; and a second controlling means that drives and controls the rotating camera base based on the digital signal from the demodulating circuit, said second controlling means being electrically connected to the demodulating circuit.

Other and further objects of this invention will become obvious upon an understanding of the illustrative embodiments about to be described and indicated in the appended claims, and various advantages not referred to herein will occur to one skilled in the art upon employment of the invention in practice.

BRIEF DESCRIPTION OF THE DRAWINGS

FIG. 5 and FIG. 6 are flowcharts showing the operation of the remote control apparatus; and FIG. 7 is a block diagram showing the electrical structure of a second embodiment exemplifying the remote control apparatus of the present invention.

DESCRIPTION OF THE PREFERRED EMBODIMENTS

[First Embodiment]

Figure 2:
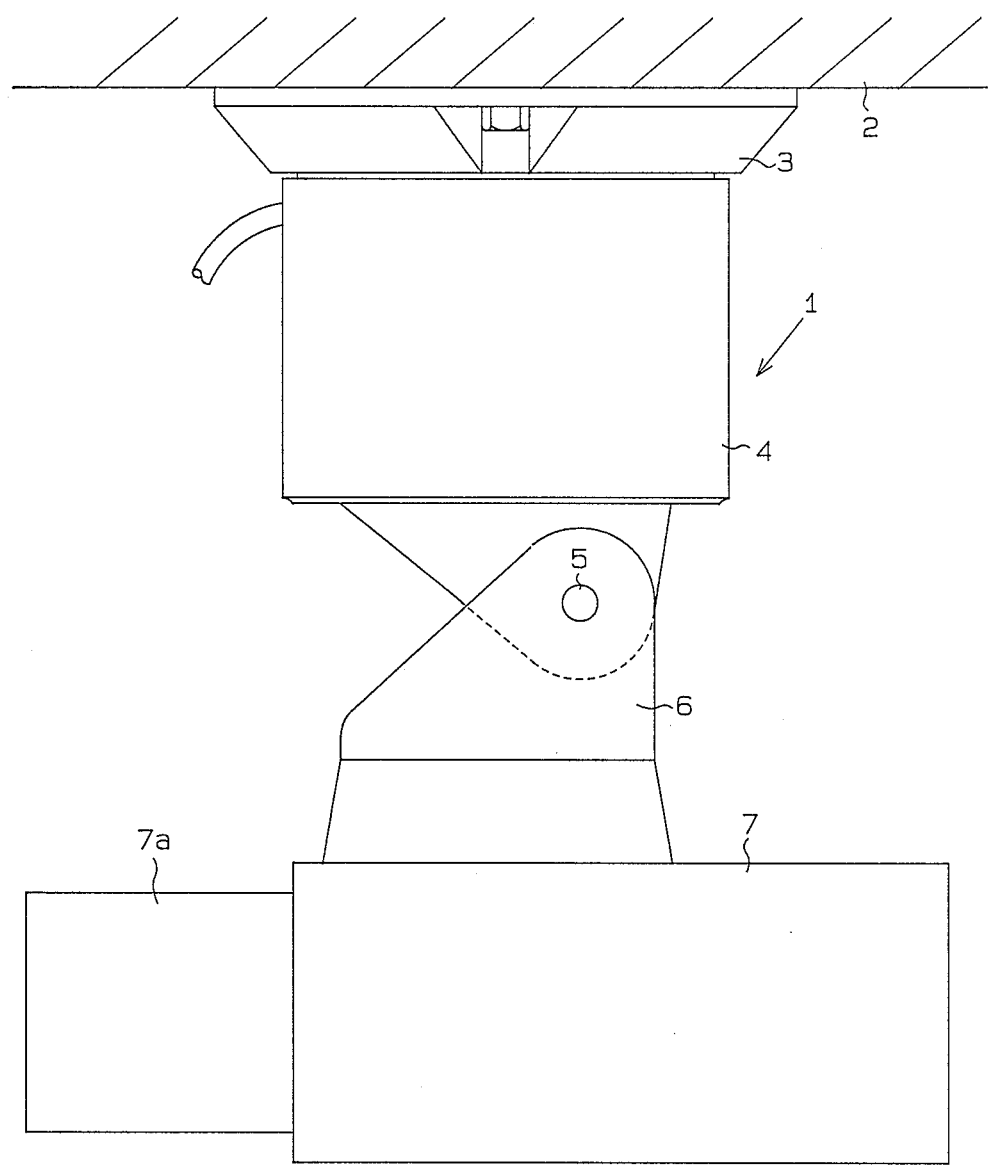
FIG. 2 is a front view of a rotating camera.

An embodiment exemplifying the present invention will be described below while referring to illustrations. The rotating camera base 1 shown in FIG. 2 is suspended from and supported at, for example, a ceiling surface 2. A horizontally rotating body 4 is supported to rotate, relative to a base 3, in the horizontal direction. A vertically rotating body 6 is supported by the horizontally rotating body 4 through a rotary shaft 5 such that it rotates in the vertical direction, and a television camera 7 is, in turn, suspended from and supported by the vertically rotating body 6. Further, a first step motor, to be described later, for rotatably driving the horizontally rotating body 4 and a second step motor, also to be described later, for rotatably driving the vertically rotating body 6 are housed inside the horizontally rotating body 4. Depending on the operation of each of the step motors, the television camera 7 can be rotated within the ranges of 360 degrees in the horizontal direction and 128 degrees in the vertical direction. Also, a lens of the television camera has a built-in motor for focus, iris and zoom adjustments.

Figure 3:
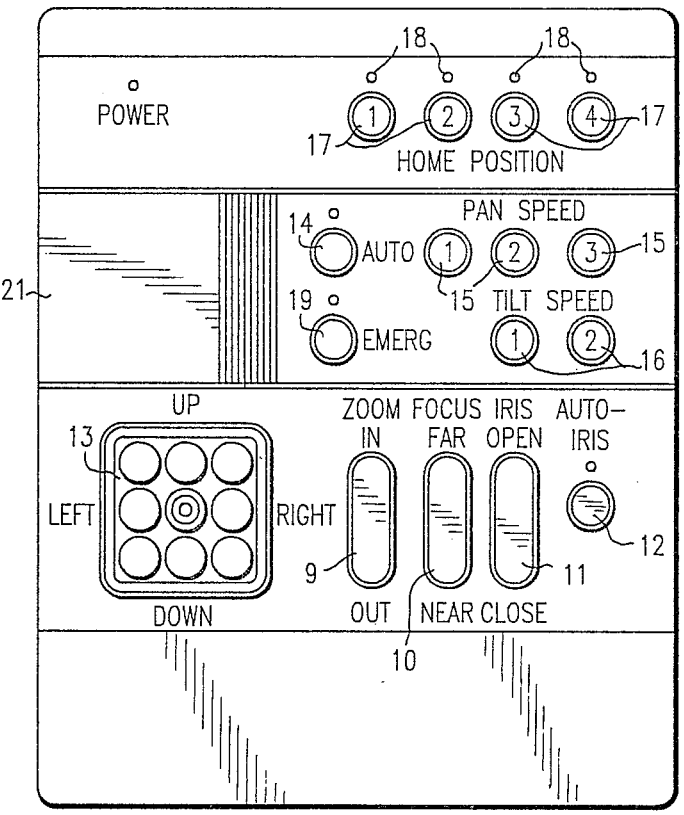
FIG. 3 is a front view of an operating panel.

The operating panel 8 shown in FIG. 3 is provided on a control box, to be described later, used for the remote control of the rotating camera base 1 and the television camera 7, with this operating panel 8 being provided with a variety of keys. The functions of these various keys are given next. A zoom button 9, a focus button 10 and an iris button 11 are used for adjusting the angle of view, focal distance, and iris diaphragm, respectively, of the television camera 7. An auto-iris button 12 is used for automatically adjusting the iris diaphragm.

Control pad 13 with nine recesses are used for manually adjusting the television camera 7 in the horizontal and vertical directions. By operating the control pad 13, the television camera 7 can be made to rotate in the direction corresponding to the position of the operated recess. An auto switch 14 is used for selecting either automatic scanning motion or manual operation of the rotating camera base 1. By presseing this switch, previously registered locations are automatically shown successively on the monitor. On the other hand, when the pressed condition of this switch is released, the operation of rotating the rotating camera base 1 by manual control using the control pad 13 is enabled.

Three panning speed control buttons 15 are used for setting the panning speed of the rotating camera base 1 during operation. Any one of three speeds of rotation is selected by pressing the corresponding button among the buttons 15.

Two tilting speed control buttons 16 are used for setting the tilting speed of the rotating camera base 1 during operation. Either one of the two speeds of rotation is selected by pressing the corresponding button among the buttons 16.

Four home position buttons 17 are used to set beforehand prescribed locations (hereinafter referred to as home positions) that are to be monitored by the television camera 7, or to access said prescribed locations as the need requires. Four home position locations corresponding to each of the four buttons 17 can be set. Also, a LED 18 (light-emitting diode) is provided above each home position button 17, and LED being made to light up when a corresponding external sensor, to be described later, provided in the corresponding home position outputs an emergency signal.

An emergency switch 19 is used to make the rotating camera base 1 rotate toward the appropriate home position based on the emergency signal from the external sensor. When this switch is pressed, the LED 20 provided above the same switch lights up. When the pressed condition of this switch is released, the action of the rotating camera base 1 based on the emergency signal from the external sensor can be disabled while the LED 20 lights up.

Figure 4:
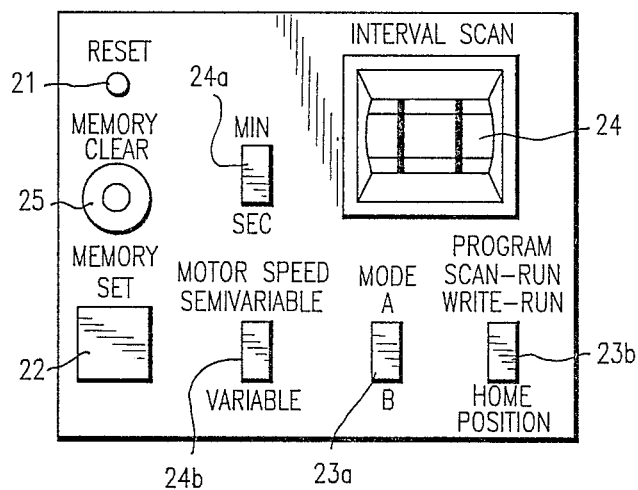
FIG. 4 is a front view showing the parts inside the sliding cover on the operating panel.

As shown in FIG. 4, various keys for setting the automatic operation of the rotating camera base 1 are provided inside a sliding cover 21 provided on one side at the upper portion of the operating panel 8. To describe each of these various keys, first, a memory button 22 is used to set the various stopping positions during automatic operation. When this button is pressed, the operating data that have been set using the control pad 13 and the panning and tilting speed control switches 15, 16 are registered in a RAM. A two-stage switching mode switch 23a is used to set the automatic operation to a plurality of modes or to select either one of the two types of mode that has been set. An A-mode or a B-mode can be selected by appropriately setting this switch upward or downward. Similarly, a two-stage switching program switch 23b is used to set to either automatic operation or to select any one of the home position settings. The appropriate setting can be selected by moving the switch upward or downward.

Interval scan switch 24 having two dials is used to set the time length of the stopping interval at each stopping position during automatic operation. The stopping interval can be set in units of seconds or minutes to two digits by appropriately setting each of the switches 24 and selecting either one of the two positions "minute" or "second" of a two-stage switching second-minute switch 24a. A memory clear button 25 is used to erase all the automatic operating modes that have been set. A two-stage switching motor speed switch 24b is provided so that, in its "SEMIVARIABLE" position, the camera base 1 is rotated at a speed selected by the control buttons 15 and 16, and in its "VARIABLE" position, the camera base 1 is rotated at a speed gradually increasing from zero without any relation with the speed selection by the control buttons 15 and 16.

Figure 1:
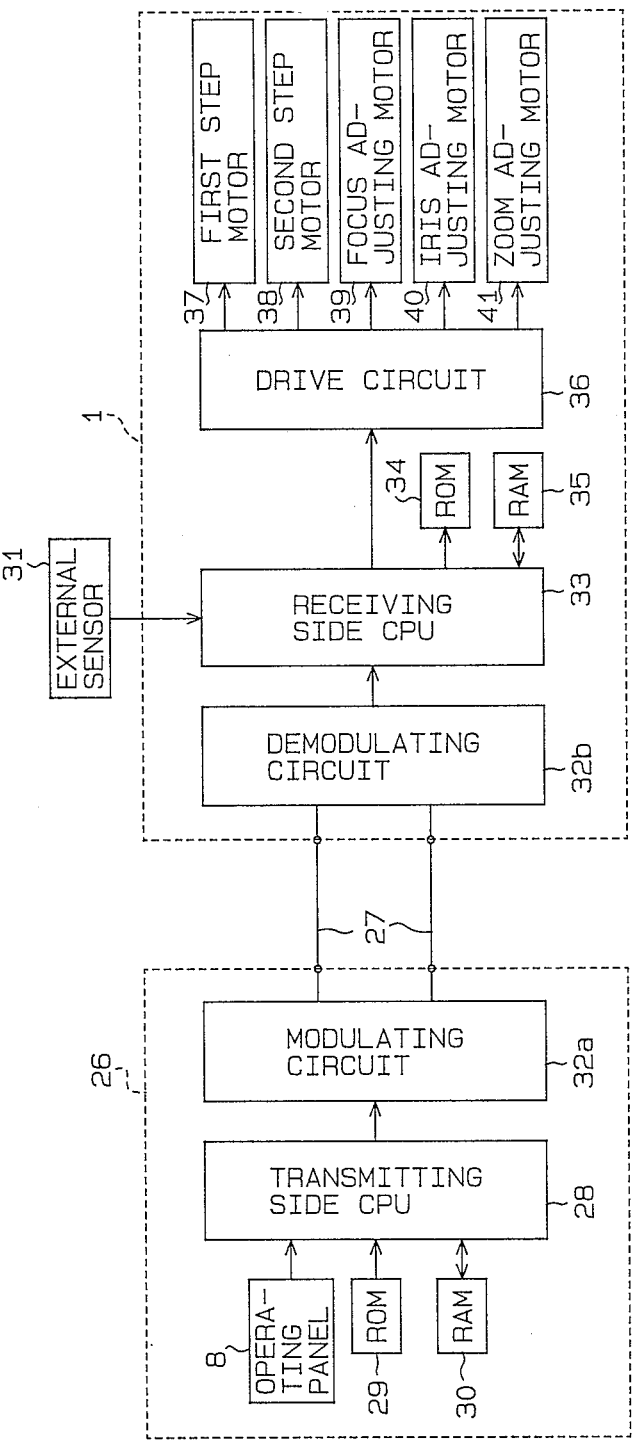
FIG. 1 is a block diagram showing the electrical structure of a remote control apparatus exemplifying the present invention.

Next, the electrical structure of the remote control apparatus for the remote control of the rotating camera base 1 is described with reference to FIG. 1. A control box 26 provided with the operating panel 8 is connected to the rotating camera base 1 by two signal lines 27, with the output signal from the various switches on the operating panel being set to a CPU 28 of the transmitting side. A ROM 29 and a RAM 30 are connected to the CPU 28 of the transmitting side. A program for operating the CPU 28 of the transmitting side is stored beforehand in the ROM 29, and various data set for the various switches during automatic operation are stored in the RAM 30.

An external sensor 31 connected to a CPU 33, to be described later, of the receiving side is provided in each of the home positions that have been set using the home position buttons 17. For there external sensors, for example, supersonic sensors or infrared sensors can be used. When an abnormal condition such as the intrusion of a trespasser into the home position is detected, the sensor sends an emergency signal to the CPU 33 of the receiving side.

The output signal from the CPU 28 of the transmitting side is sent to a modulating circuit 32a. This modulating circuit 32a performs a modulating operation on the digital signal from the CPU 28 of the transmitting side using a prescribed carrier wave in order to make the signal suitable for transmission. The output from this operation is sent along the signal line 27 to a demodulating circuit 32b provided inside the rotating camera base 1. The demodulating circuit 32b separates the carrier wave from the output signal sent by the modulating circuit 32a, recovers the digital signal and outputs this recovered signal to the CPU 33 of the receiving side. Thus, the modulating circuit 32a inside the control box 26 and the demodulating circuit 32b inside the rotating camera base 1 make up a modem.

Likewise, a ROM 34 and a RAM 35 are connected to the CPU 33 of the receiving side. A program or operating the rotating camera base 1 based on the output signal from the CPU 28 of the transmitting side is stored beforehand in the ROM 34. The output signal from the CPU35 and the CPU 33 of the receiving side is operated based on this stored data and the program stored in the ROM 34.

The output signal from the CPU 33 of the receiving side is sent to a drive circuit 36. A first step motor 37 for driving the horizontally rotating body 4 to rotate, a second step motor 38 for driving the vertically rotating body 6 to rotate, a motor 39 for adjusting the focus, a motor 40 for adjusting the iris, and a motor 41 for adjusting the zooming operation of the television camera are connected to this drive circuit 36.

Next, the operation of the remote control apparatus for the rotating camera base 1 having the structure described above will be explained.

Figure 5:
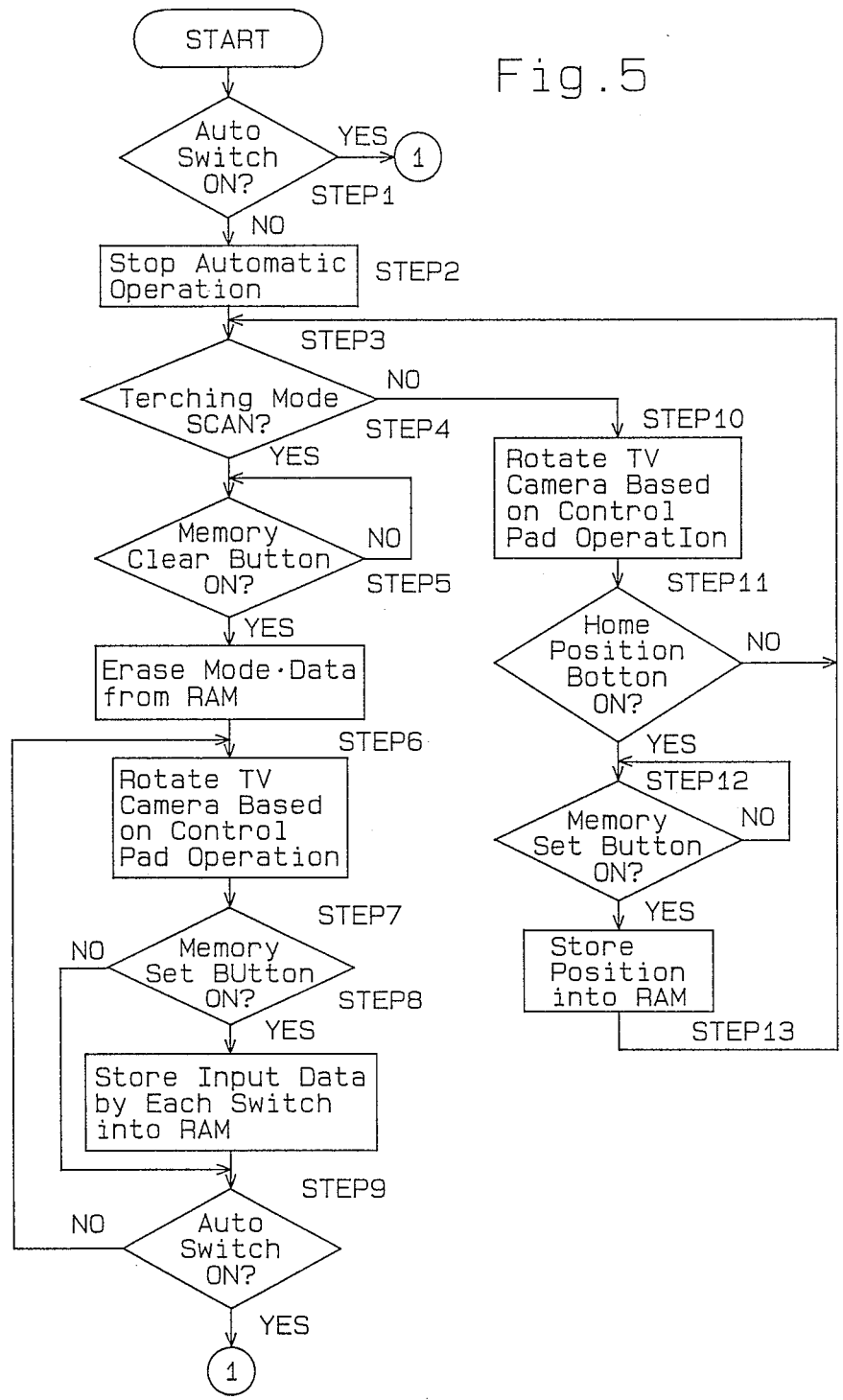

The process of setting the rotating camera base 1 to a desired automatic operating state is described with reference to FIG. 5. First, a choice is made as to which of the two automatic operating modes, A or B, is to be set. For example, if the mode switch 23a is switched to A mode and the pressed state of the auto switch 14 is released, the CPU 28 of the transmitting side detects this releasing action (STEP 1, hereinafter STEP will be abbreviated as S), and, when the system is in a state of automatic operation, stops this automatic operation (S2). Next, to set to automatic operation, the program switch 23b is switched to SCAN RUN, and, when the memory clear button 25 is pressed (S3, S4), the CPU 28 of the transmitting side erases the data for A mode automatic operation that are stored in the RAM 30 and performs initialization (S5). In this state, for example, when the control pad 13 are used to set the data for an automatic operation involving changing the speed of the reciprocating motion between two points A and B, the CPU 28 of the transmitting side drives the first and second step motors 37, 38 through the CPU 33 of the receiving side, and the television camera 7 rotates in the direction corresponding to the operated control pad 13 (S6). In this way, the television camera 7 can be made to rotate in order to inspect a desired location "A" while looking at the monitor. Also, the picture shown on the monitor can be adjusted as desired using the zoom button 9, focus button 10 and iris button 11. When the memory set button 22 is pressed (S7) after any one of the panning speed control buttons 15 is selected and set, and desired stopping interval is set using the interval scan switch 24a, the CPU 28 of the transmitting side stores the rotation angle up to the point A and the speed of rotation of the television camera 7 and the stopping interval at the point A in the RAM 30 (S8).

After this, to set to automatic operation from point A to point B, in the same manner as previously mentioned, the television camera 7 is rotated using the control pad 13 such that the point B is caught by the camera 7. Then, when the memory set switch 22 is pressed after any one of the panning speed control switches 15 is selected and the desired stopping interval is set using the interval scan switch 24, the CPU 28 of the transmitting side stores the angle of rotation of the television camera 7 up to the point B, its speed of rotation and the stopping interval at point B in the RAM 30. By this operation, with the camera stopping for the prescribed time intervals at the points A and B, the process of setting the operating data for automatic reciprocating motion between the points A and B at varying speed is completed. During automatic operation, the television camera 7 undergoes rectilinear motion between the two points A and B regardless of the path of rotation in scanning, with the tilting speed being calculated and stored based on the stored panning speed. Afterward, when the auto switch 14 is pressed (S19), the process of setting to automatic operation becomes complete, and, as shown in FIG. 6, the CPU 28 of the transmitting side begins to perform automatic operation.

Also, to explain the procedure for the case of setting a plurality of home positions, first, the auto switch 14 is pressed to stop automatic operation (S1, S2), and, when the program switch 23b is switched to the HOME POSITION setting (S3), the CPU 28 of the transmitting side enters a state in which it receives the output signals from the various switches. During this time, a desired home position can be shown on the monitor by operating the control pad 13, and others (S10). In this state, when any one of the home position buttons 17 is pressed and the memory set switch 22 is likewise pressed (S11, S12), the CPU 28 of the transmitting side stores the selected home position in the RAM 30 (S13). By repeating this procedure, one can establish up to four home positions, each set in any location.

Next, the operation of the rotating camera base 1 is explained. When the auto switch 14 is pressed (S1), as shown in FIG. 6, the CPU 28 of the transmitting side performs automatic operation at the mode, either at mode A or mode B, selected using the mode switch 23a (S14, S15, S16). Then, when any one of the home position buttons 17 is pressed (S15) during this automatic operation, the CPU 28 of the transmitting side, through the CPU 33 of the receiving side, causes the television camera 7 to rotate and stop such that the home position corresponding to the selected home position button 17 is shown on the monitor (S17), where the operation is switched from the automatic operation to manual operation. This state is maintained until the pressed station switch 17 is released.

Still under automatic operation, when an external sensor 31 detects an abnormal condition such as the presence of an intruder, or others, in any of the home positions and outputs an emergency signal, the CPU 33 of the receiving side detects this emergency signal (S16). Then, when the emrergency switch 19 is in a pressed state the CPU 33 of the receiving side causes the television camera 7 to rotate toward the home position from which the emergency signal has been sent, shows the scene in the home position on the monitor (S18, S19), and maintains this state until the emergency signal stops coming or for an interval time for stopping the camera 7 which has been set by the interval scan switch 24a. On the other hand, when an emergency signal is sent by an external sensor 31 and the emergency switch 19 is not in a pressed state, the CPU 33 of the receiving side makes the LED 18 on the corresponding home position button 17 light up while maintaining automatic operation of the television camera 7 (S18, S20).

As described in the preceding, in this remote control apparatus, the control box 26 and the rotating camera base 1 are connected through a modem comprising the modulating circuit 32a and the demodulating circuit 32b. Since the signal lines 27 comprise two, or, including the ground line, three lines, the wiring operation becomes very simplified, and since the system is not susceptible to the effects of noise, the signal lines 27 can be extended up to a length of about 10 kms.

It is also possible to set the system beforehand to multiple mode automatic operation, wherein the camera makes reciprocating motion along a plurality of locations and shows those locations on the monitor. Since the system can automatically operate under the above set mode, an operator does not need to oprate the remote control apparatus on a continuing basis. Thus, monitoring operation through a monitor screen can be performed more easily.

Further, aside from automatic operating mode, a plurality of home positions can be set beforehand and a desired home position can be given priority and be made to be shown on the monitor by operating the home position buttons 17. Thus, a specific location that has been set as a home position can be shown on the screen and be monitored immediately. Also, if the emergency switch 19 is pressed, when an abnormal condition is detected by the external sensor 31 in any of the home positions, the home position in question becomes shown on the monitor regardless of the setting of the buttons 17. Therefore, the occurrence of an abnormal condition can be detected speedily. When the emergency switch 19 is not pressed, even when an abnormal condition has been detected in a certain home position, automatic operation is maintained, but the LED 18 on the buttons 17 corresponding to the home position where the abnormal condition has been detected lights up. Therefore, when the external sensor 31 sends out an emergency signal because of some cause other than the encroachment of an intruder, or others, the unnecessary discontinuance of the automatic operation can be prevented, while the presence or absence of an emergency signal can be verified through the LED 18. [Second Embodiment]

Next, a second embodiment exemplifying the present invention will be described with reference to FIG. 7. As in the remote control apparatus of the first embodiment, in the remote control apparatus of the present embodiment, the control box 26 and the rotating camera base 1 are connected by two signal lines 27. The signal sent from the CPU 28 of the transmitting side inside the control box 26 is sent along the signal line 27 via a transmission circuit 51a in the transmitting side and becomes inputted to the CPU 33 of the receiving side inside the rotating camera base 1 via a transmission circuit 51b on the receiving side.

A description of the transmission circuit 51a of the transmission side is given next. The base of a transistor 55a is connected to the output terminal of the CPU 28 of the transmitting side via a pair of inverters 52a, 53a and a resistor 54a. The interval between the transistor 55 and the resistor 54a is connected to a ground line via a resistor 56a. The emitter of the transistor 55 is likewise grounded; on the other hand, the collector is applied with a voltage of 5 V via a light-emitting diode 57a, serving as a light-emitting element, and a resistor 58a. A phototransistor 59a, serving as a light-receiving element, is placed facing this light-emitting diode 57a. These two elements make up a photocoupler 60a serving as a first signal transforming means.

A light-emitting diode 61a is connected to the emitter of the phototransistor 59a such that it is positively biased and a pair of diodes 62a, 63a are connected in series and negatively biased between the cathode of the light-emitting diode 61a and the collector of the phototransistor 59a. Further the line between the pair of diodes 62a, 63a is connected to the line between the phototransistor 59a and the light-emitting diode 61a. A surge absorber 64a for absorbing surge current is connected in parallel with the pair of diodes 62a, 63a. Both terminals of this surge absorber 64a are connected to the signal lines 27 via the resistors 65a and 66a respectively.

A phototransistor 67a is placed facing the light-emitting diode 61a, these two elements making up a photocoupler 68a. The emitter of the phototransistor 67a is connected to the ground line, while the collector is connected to the input terminal of the CPU 28 of the transmitting side via an inverter 69a. Further, the line between the phototransistor 67a and the inverter 69a is applied with a voltage of 5 V via a resistor 70a.

The transmission circuit 51a of the transmitting side is constructed as above and a transmission circuit 51b of the receiving side is similarly constructed. For convenience, the corresponding various elements of the transmission circuit 51b of the receiving side will be referred to with the same numbers except for use of the suffix "b" in exchange for the suffix "a" in the previous circuit. Likewise, descriptions of the various elements will be omitted. In this transmission circuit of the receiving side, a photocoupler 68b, serving as a second signal transforming means, is made up of the light-emitting diode 61b, serving as a light-emitting element, and the phototransistor 67b, serving as light-receiving element. A power source 71 for driving the phototransistors 59a, 59b of both transmission circuits 51a, 51b is connected between the diode 63a and surge absorber 64a in the transmission circuit 51a of the transmitting side.

Next, the operation of the remote control apparatus, specifically, the transmission circuits 51a, 51b, constructed as above, of the rotating camera base 1 is explained.

First, consider the case of making the rotating camera perform a desired function by operating on the various switches on the operating panel 8. When the CPU 28 of the transmitting side sends out a signal based on the operated switch, this signal is sent through the pair of inverters 52a, 53a of the transmission circuit 51a of the transmitting side and flows into the base-emitter interval of the transistor 55a. The transistor 55a is turned on or off depending on the high/low state of the received signal. When this transistor is turned on, current flows from the collector to the emitter, causing the light-emitting diode 57a to emit light, thus sending a light signal. This light signal is in turn received by the phototransistor 59a and is turned on (or off) accordingly.

When the phototransistor 59a is turned on, current flows, as shown by the arrow in FIG. 7, from this phototransistor 59a to the light-emitting diode 61a, power source 71, resistor 66a, signal line 27, to the resistor 66b, phototransistor 59b, light-emitting diode 61b, and resistor 65b of the transmission circuit 51b of the receiving side, to the signal line 27, the resistor 65a and back to the phototransistor 59a of the transmission circuit 51a of the transmitting side, this current flow thus forming a closed circuit (current loop).

Since the closed circuit mentioned above is formed such that it is in synchrony with the signal sent by the CPU 28 of the transmitting side, when the light-emitting diode 61b of the transmission circuit 51b of the receiving side emits light and sends out a light signal, the phototransistor 67b that receives this light signal is turned on or off based on the signal from the CPU 28 of the transmitting side. When the phototransistor 27b is turned off, a 5 V voltage is applied on the inverter 69b; when the same phototransistor 67b is turned on, a current flows into the resistor 70b and since a voltage drop arises, a voltage lower than 5 V is applied on the inverter 69b. The inverter 69b reverses the polarity of this voltage and sends it to the CPU 33 of the receiving side. Based on this input signal, the CPU 33 drives and controls the motors 37-41 via the drive circuit 36, thus making the rotating camera 1 perform the desired operation.

When a closed circuit is formed as mentioned above, a current also flows into the light-emitting diode 61a. The light signal form this diode is received by the phototransistor 67a and is turned on. This phototransistor 67a sends a signal to the CPU 28 of the transmitting side but the CPU 28 of the transmitting side is designed to be unaffected by this particular signal. As will be mentioned later, this is also true in the case where a signal is sent from the CPU 33 of the receiving side.

In order to form the closed circuit mentioned previously, there is a need to turn on the phototransistor 59b. To realize this, when the CPU 28 of the transmitting side is sending an output signal, the light-emitting diode 57b is made to emit light by the CPU 33 of the receiving side so that the phototransistor 59b is turned on. As will be mentioned later, this is also true in the case where a signal is sent from the CPU 33 of the receiving side.

The above described is the case where a signal is sent from the CPU 28 of the transmitting side to the CPU 33 of the receiving side. However, when a signal is sent from the CPU 33 of the receiving side to the CPU 28 of the transmitting side, as in the case where an LED 18 on the operating panel 8 is made to light up based on an emergency signal coming from an external sensor 31, the process is exactly the same. Thus, the CPU 33 of the receiving side sending the emergency signal from an external sensor 31 turns on (or off) the light-emitting diode 57b and drives the phototransistor 59b. Then, from this phototransistor 59b, current flows to the light-emitting diode 61b, resistor 65b, signal line 27, to the resistor 65a, phototransistor 59a, light-emitting diode 61a, power source 71, and resistor 66a in the transmission circuit 51a of the transmitting side, to the signal line 27, and then to the resistor 66b and back to the phototransistor 59b in the transmission circuit 51b of the receiving side, thus forming a closed circuit. Further, the light-emitting diode 61a in the transmission circuit 51a of the transmitting side lights up and sends a light signal. The phototransistor 67a receiving this light signal performs a switching operation; when on, it sends a signal to the CPU 28 of the transmitting side and the same CPU 28 of the transmitting side causes the LED 18 on the operating panel 8 to light up.

As described above, in this remote control apparatus, since the electrical signal sent by one of the CPU's 28, 33 is transformed to a light signal and again back to an electrical signal by the photocouplers 60a, 60b, 68a, 68b, and inputs the final signal to the other CPU 28, 33, even when noise is present in the original signal output from the CPU 28, 33, this noise component is eliminated by the photocouplers 60a, 60b, 68a, 68b and becomes negligible at the stage of input to the other CPU 28, 33.

Also, in the remote control apparatus of the present embodiment, the control box 26 and the rotating camera 1 are connected by the signal lines 27 and are constructed such that the electrical signal sent from any one side is transmitted to the other side through the signal lines 27. However, for example, the light-emitting diodes 57a, 57b, serving as light-emitting elements at the output terminals of the two components 26, 1, may both be connected directly by optical fiber cables to the phototransistors 67b, 67a respectively. In this case, the light signal sent, as is, by either one of the light-emitting diodes 57a, 57b is transmitted to the corresponding phototransistor 67b, 67a, without being transformed to an electrical signal, thus preventing the occurrence of operational failure due to the effect of noise. Further, in the remote control apparatus of the present embodiment, light-emitting diodes 57a, 57b, 61a, 61b are used as light-emitting elements, and phototransistors 59a, 59b, 67a, 67b are used as light-receiving elements, but these may be substituted with other light-emitting elements and light-receiving elements. For example, a semiconductor laser may be used as a light-emitting element and a photodiode may be used as a light-receiving element.

As many apparently widely different embodiments of this invention may be made without departing from the spirit and scope thereof, it is to be understood that the invention is not limited to the specific embodiments thereof except as defined in the appended claims.

What is claimed is:

1. A remote control apparatus for a rotating camera base that supports a television camera such that it is rotatable in the horizontal and vertical directions, said remote control apparatus for a rotating camera comprising:
    a first controlling means that outputs a digital signal for driving and controlling said rotating camera base,
    a modem for receiving and transmitting said digital signal outputted from said first controlling means for driving and controlling said rotating camera base, said modem including a modulating circuit and a demodulating circuit;
    a control box including said modulating circuit that outputs the modulated version of the digital signal from said first controlling means with a prescribed carrier wave, said modulating circuit being electrically connected to said first controlling means,
    said demodulating circuit that recovers the digital signal from the modulated input from said modulating circuit being provided in said rotating camera base and electrically connected to said modulating circuit, and
    a second controlling means that drives and controls said rotating camera base based on the digital signal from said demodulating circuit, said second controlling means being electrically connected to said demodulating circuit of said modem.

2. A remote control apparatus for a rotating camera base that supports a television camera such that it is rotatable in the horizontal and vertical directions, said remote control apparatus for a rotating base comprising:
    an input means for inputting the operating data for the automatic operation of said rotating camera base,
    a storing means electrically connected to said input means for storing the operating data inputted by means of said input means, said storing means including a random access memory, and
    a controlling means that controls the automatic operation of the rotating camera base based on previously stored operating data stored in said storing means, said controlling means being electrically connected to said storing means
    whereby operating data previously stored in said storing means is employed to automatically operate the rotating camera base in accordance with said previously stored operating data.

3. A remote control apparatus for a rotating camera base, as set forth in claim 2, wherein
    said input means further includes a second input means for inputting the home position data used for making said rotating camera base rotate to prescribed home positions during automatic operation,
    said storing means further stores the home position data inputted by means of aid second input means,
    an instructing means is further provided for inputting to said controlling means the instruction signals for making said rotating camera base rotate to prescribed home positions during automatic operation, said instructing means being electrically connected to said controlling means, and said controlling means further makes said rotating camera base rotate to a prescribed home position during automatic operation according to the instruction signals from said instructing means, based on said home position data stored in said storing means.

4. A remote control apparatus for a rotating camera base, as set forth in claim 2, wherein said input means further includes a second input means for inputting the home position data used for making said rotating camera base rotate to prescribed home positions during automatic operation, said storing means further stores the home position data inputted by means of said second input means, external sensors that send an emergency signal to said controlling means are provided in said prescribed home positions and are electrically connected to said controlling means, and said controlling means further makes said rotating camera base rotate to a prescribed home position based on the emergency signal sent from the external sensor and on said home position data stored in said storing means.

5. A remote control apparatus for a rotating camera base, as set forth in claim 4, that is further provided with a disabling means that prevents, based on the emergency signal from said external sensors, said controlling means from making said rotating camera base rotate to a prescribed home position, said disabling means being electrically connected to said external sensor, and a display means that shows the presence or absence of said emergency signal, said display means being electrically connected to said external sensor.

6. A remote control apparatus for a rotating camera base that supports a television camera such that it is rotatable in the horizontal and vertical directions, said remote control apparatus for a rotating camera base comprising a control box that outputs an electrical signal for driving and controlling said rotating camera base, a photocoupler including a light-emitting element that transforms said electrical signal from said control box to a light signal, said light-emitting element being provided in said control box, said photocoupler further including a light-receiving element that transforms the light signal from said light-emitting element to an electrical signal and outputs the electrical signal to said rotating camera base, said light-receiving element being provided in said rotating camera base, a transmitting means for transmitting the light signal from said light-emitting element to said light-receiving element, said transmitting means being provided between said control box and said rotating camera base, and a controlling means that drives and controls said rotating camera base based on the signal from said light-receiving element, said controlling means being provided in said rotating camera base and electrically connected to said light-receiving element.

7. A remote control apparatus for a rotating camera base, as set forth in claim 6, wherein said transmitting means comprises a second light-receiving element that transforms the light signal from said light-emitting element to an electrical signal, said second light-receiving element being provided in said control box; a second light-emitting element that transforms the electrical signal from said second light-receiving element to a light signal, said second light-emitting element being provided in the rotating camera base; and a signal line that electrically connects said second light-receiving element and said second light-emitting element, and said light-receiving element transforms the light signal from said second light-emitting element to an electrical signal and outputs the electrical signal to said controlling means.

* * * * *

(12) EX PARTE REEXAMINATION CERTIFICATE (8063rd)

United States Patent
Sasaki

(10) Number: US 4,974,088 C1
(45) Certificate Issued: Mar. 8, 2011

(54) REMOTE CONTROL APPARATUS FOR A ROTATING TELEVISION CAMERA BASE

(75) Inventor: Takeshi Sasaki, Toyota (JP)

(73) Assignee: Lectrolarm Custom Systems, Inc., Memphis, TN (US)

Reexamination Request:
No. 90/007,400, Jan. 28, 2005

Reexamination Certificate for:
Patent No.: 4,974,088
Issued: Nov. 27, 1990
Appl. No.: 07/350,761
Filed: May 12, 1989

(30) Foreign Application Priority Data

May 13, 1988 (JP) .............................. 63-117743
May 13, 1988 (JP) .............................. 63-117744

(51) Int. Cl.
*H04N 5/232* (2006.01)
*G08B 15/00* (2006.01)

(52) U.S. Cl. .............................. 348/211.6; 348/E5.043
(58) Field of Classification Search .................... None
See application file for complete search history.

(56) References Cited

PUBLICATIONS

Declaration of Dr. V. Thomas Rhyne, Jan. 13, 2004.*
Comparison Chart of Amended Order and Vicon VPS1200 System rec'd Jun. 21, 2006.*
Comparison Chart of Amended Order and SensorVision System rec'd Jun. 21, 2006.*
Comparison Chart of Claims 1–6 and Amended Order rec'd Jun. 21, 2006.*
IEEE Standard Dictionary of Electrical and Electronics Terms, Fourth Edition, title pages, and pp. 16, 17, 779; Jul. 8, 1988.*
Exhibit B—VPS 1200 Instruction Manual, Sheet X379, R682, Jun. 1982.
Exhibit C—Instructions for Model V–1200X–MD, Sheet X443, R885, Aug. 1985.
Exhibit D—Instructions For Model V282MFL, Sheet X447, R387, Mar. 1987.
Exhibit E—Instructions For Model V330APT, Sheet X432, R687, Jun. 1987.
Exhibit F—Sensorvision Technical Service Manual, 1986.

* cited by examiner

*Primary Examiner*—Joseph R Pokrzywa

(57) ABSTRACT

A remote control apparatus for a rotating camera base that supports a television camera such that it is rotatable in the horizontal and vertical directions. The remote control apparatus comprises a first controlling circuit that outputs a digital signal for driving and controlling the rotating camera base; a control box including a modulating circuit that outputs a modulated version of the digital signal from the first controlling circuit with a prescribed carrier wave, said control box being electrically connected to the first controlling circuit; a demodulating circuit that recovers the digital signal from the modulated wave from the modulating circuit, said demodulating circuit being provided in the rotating camera base and electrically connected to the modulating circuit; and a second controlling circuit that drives and controls the rotating camera base based on the digital signal from the demodulating circuit, said second controlling circuit being electrically connected to the demodulating circuit.

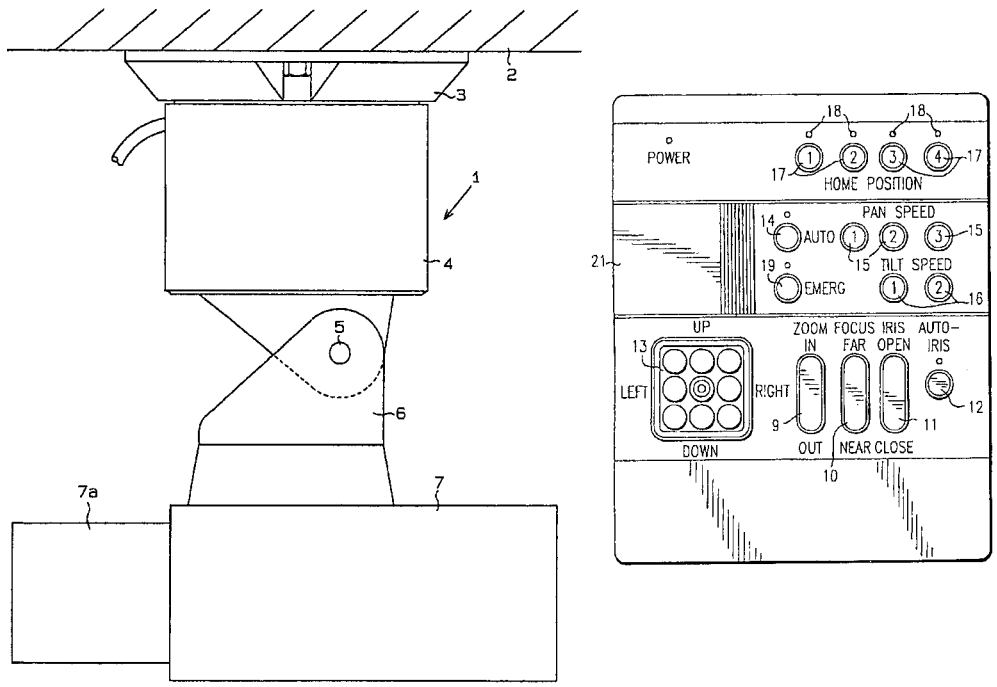

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 2-5 and 7 is confirmed.

Claims 1 and 6 are cancelled.

\* \* \* \* \*

(12) EX PARTE REEXAMINATION CERTIFICATE (9382nd)

United States Patent
Sasaki

(10) Number: US 4,974,088 C2
(45) Certificate Issued: Oct. 26, 2012

(54) REMOTE CONTROL APPARATUS FOR A ROTATING TELEVISION CAMERA BASE

(75) Inventor: Takeshi Sasaki, Toyota (JP)

(73) Assignee: Lectrolarm Custom Systems, Inc., Memphis, TN (US)

Reexamination Request:
No. 90/011,328, Nov. 19, 2010

Reexamination Certificate for:
Patent No.: 4,974,088
Issued: Nov. 27, 1990
Appl. No.: 07/350,761
Filed: May 12, 1989

Reexamination Certificate C1 4,974,088 issued Mar. 8, 2011

(30) Foreign Application Priority Data

May 13, 1988 (JP) .................................... 63-117743
May 13, 1988 (JP) .................................... 63-117744

(51) Int. Cl.
*H04N 5/232* (2006.01)
(52) U.S. Cl. ................................ 348/211.6; 348/E5.043
(58) Field of Classification Search .................. None
See application file for complete search history.

(56) References Cited

To view the complete listing of prior art documents cited during the proceeding for Reexamination Control Number 90/011,328, please refer to the USPTO's public Patent Application Information Retrieval (PAIR) system under the Display References tab.

*Primary Examiner* — Colin Larose

(57) ABSTRACT

A remote control apparatus for a rotating camera base that supports a television camera such that it is rotatable in the horizontal and vertical directions. The remote control apparatus comprises a first controlling circuit that outputs a digital signal for driving and controlling the rotating camera base; a control box including a modulating circuit that outputs a modulated version of the digital signal from the first controlling circuit with a prescribed carrier wave, said control box being electrically connected to the first controlling circuit; a demodulating circuit that recovers the digital signal from the modulated wave from the modulating circuit, said demodulating circuit being provided in the rotating camera base and electrically connected to the modulating circuit; and a second controlling circuit that drives and controls the rotating camera base based on the digital signal from the demodulating circuit, said second controlling circuit being electrically connected to the demodulating circuit.

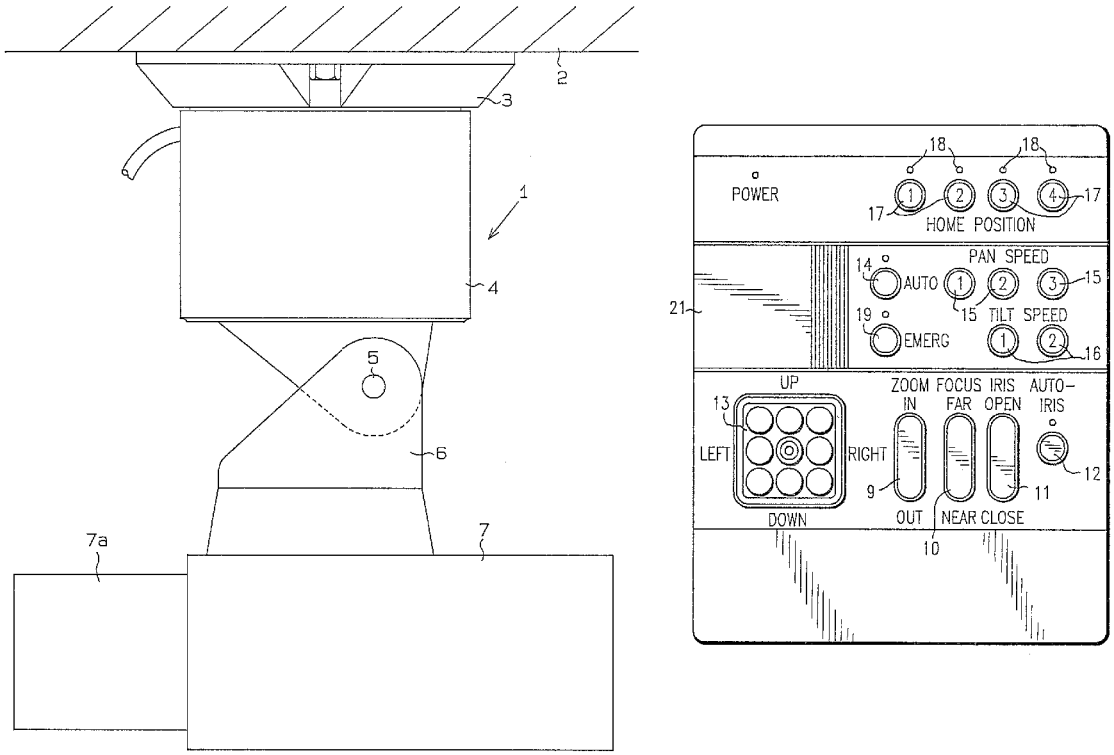

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 2-5 is confirmed.

Claims 1 and 6 were previously cancelled.

Claim 7 was not reexamined.

* * * * *